W. Hamilton,
Making Sheet-Metal Vessels.
Nº 9,322. Patented Oct. 12, 1852.
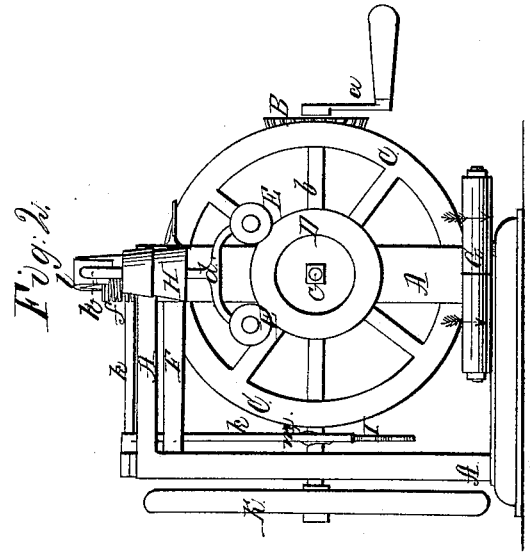
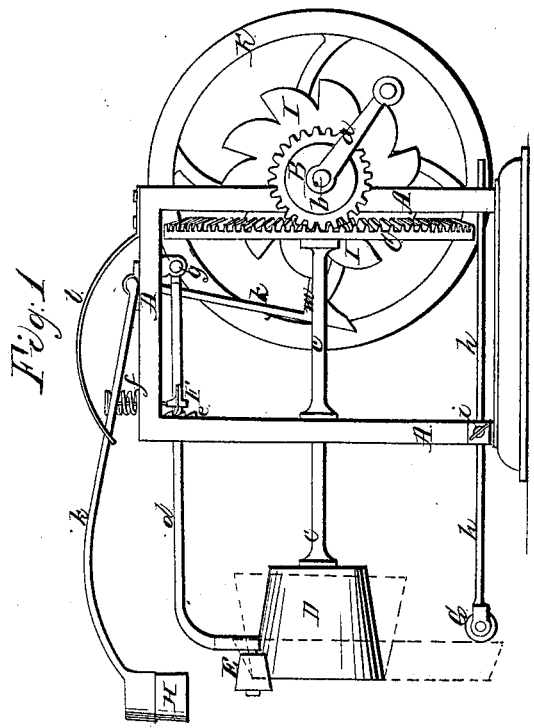

UNITED STATES PATENT OFFICE.

WALTER HAMILTON, OF ELMIRA, NEW YORK.

IMPROVEMENT IN DOUBLE-SEAMING MACHINES.

Specification forming part of Letters Patent No. 9,322, dated October 12, 1852.

*To all whom it may concern:*

Be it known that I, WALTER HAMILTON, of Elmira, in the county of Chemung and State of New York, have made certain new and useful Improvements in Machines for Double-Seaming Tin or other Ware; and I do hereby declare that the following is a full, clear, and exact description of the construction and operation of the same, reference being had to the annexed drawings, making a part of this specification, in which—

Figure 1 is a side elevation, Fig. 2 an end elevation, of the machine complete.

The nature of my improvements consists in the use of a mandrel moved by any mechanical device, upon which different-sized heads or rests and upon which the material to be worked are placed, in connection with the employment of an automatic mallet, with other arrangements by which the double-seaming is performed with ease and dispatch, and with a greater degree of uniformity and regularity than heretofore, the construction of which is as follows: On a suitable frame, A, I place a pinion, B, on a shaft, $b$, running transverse of the machine and worked by a crank, $a$. This pinion gears into a large bevel-driver, C, supported in place by the shaft or mandrel $c$, passing through it. On the outer extremity of this mandrel a head, D, is secured, which is removable at pleasure, and is somewhat conical in form, (see drawings,) which may, however, be superseded by other heads of a different form or size, as the case may require. Against the edge of this head and above it two small pressing-rollers, E, are held by a bent rod or bar, $d$, with its center of fulcrum at $g$, and supported in place by a lifting or gage lever, F, working in the rack $e$ in the side of the frame and held by the spiral spring $f$. Below the head D a rod or gage-slide, $h$, projects from the machine, carrying rollers G, which serve to steady the material when placed on the head. This slide can be moved out or in, and turned up, as the case may be, at any angle, or, as in the drawings, may lie horizontal in either position held by the binding-screw $i$. A bent lever, $k$, carrying a mallet, H, passes back across the machine and down toward the mandrel $c$, where it spreads out, as at $m$, in an angular shape and engages with a cam-wheel, I, so that as this wheel revolves this short arm of the lever is moved outward, and which consequently raises the long arm carrying the mallet H, and then is forced down by a strong spring, $l$, which is rendered free to act by the short arm becoming for the moment clear of the cam-wheel I on the driving-shaft $b$. K is an ordinary fly-wheel. The rollers of the steadying-gage always lie in a horizontal position, and the outer or upper edges of the work press against them as it is carried around with the mandrel, as shown in drawings by dotted lines, causing one of said rollers to turn up and the other down, as indicated by the arrows in the drawings. It is intended to use three or more sized mandrel-heads—say, one of five inches diameter, one of four, and one of three inches and a half; and it is not necessary that the mandrel-head should equal in diameter the article to be seamed, and in most cases it will probably be less by one-half. For instance, ten-quart pans, which have a diameter of eleven inches, will not require a mandrel-head of over five inches in diameter. It is only the bottoms, or, rather, the seams securing the bottoms, that are operated upon by my machine. The work will be prepared in the same manner as if the operation was to be performed by hand, and this is done by locking the edges of the bottom and sides together by means of machines now in use; and the double-seaming performed by my machine consists in knocking down the edges thus locked together firmly against the sides of the vessel by the blow of the automatic mallet.

The operation of the machine is as follows: The material to be seamed is brought on the head H and pressed down by the small rollers E, the whole being steadied by the rollers G. Thus arranged, the crank $a$ is turned, causing the head in its place to revolve, carrying with it the material, slowly around, while the mallet, by the movement of the cam-wheel I, is made to beat or fall along the edge of the material with rapid strokes, by which means the seaming is executed.

It is obvious that this simple arrangement is subject to many modifications. I therefore do not confine myself to the exact mechanical means amployed therein to facititate the operation of the same, but to that substantially as herein described.

Having thus fully described the construction and operation of my improved machine, what I desire to secure by Letters Patent is—

1. The mandrel with heads removable at pleasure, in combination with two or more pressure-rollers operating with the same, and with a mallet acting simultaneously with said mandrel and pressure-rollers.

2. The adjustable steadying-rollers G, or their equivalent, arranged with reference to the mandrel, and acting substantially in the manner and for the purpose herein set forth.

WALTER HAMILTON.

Witnesses:
G. A. GRIDLEY,
C. CARPENTER.